W. A. H. SCHREIBER.
Earthenware for Culinary Departments.
No. 151,246.  Patented May 26, 1874.
FIG. I.
FIG. II.
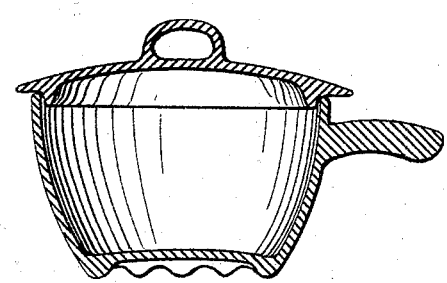
FIG. III.
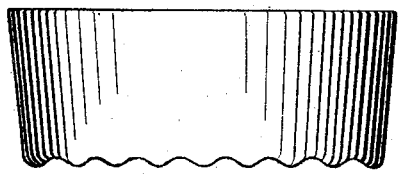
FIG. IV.
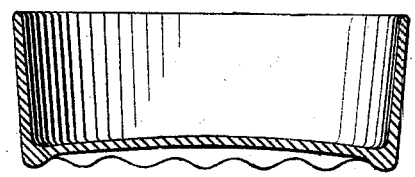
FIG. V.
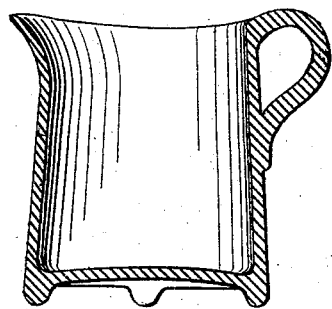
WITNESSES.  INVENTOR.

UNITED STATES PATENT OFFICE.

WILLIAM A. H. SCHREIBER, OF PHŒNIXVILLE, PENNSYLVANIA.

IMPROVEMENT IN EARTHENWARE FOR CULINARY DEPARTMENTS.

Specification forming part of Letters Patent No. 151,246, dated May 26, 1874; application filed March 21, 1874.

*To all whom it may concern:*

Be it known that I, WILLIAM A. H. SCHREIBER, of Phœnixville, Chester county, Pennsylvania, have invented Earthenware for Culinary Departments, of which the following is a specification:

My invention has for its object furnishing an improved fire-proof earthenware, designed especially for the culinary department, constructed so as to insure safety from bursting by expansion and contraction, and at the same time so as to allow the heat to radiate from under the vessel, and also allow atmospheric air to mingle with the heated air under its bottom, thus preventing the contents of the vessel from burning.

The nature of my invention consists in making cooking utensils for the culinary department of fire-proof earthenware, in such a manner that the bottoms will be corrugated for the escape of heated air, and permit an admixture of atmospheric air, as will hereinafter be more fully described and shown in the accompanying drawings, forming part of this specification, in which—

Figure 1 represents a side view of my improved stew-pan; Fig. 2, a sectional view of the same; Fig. 3, a side view of a nappy or pudding-dish; Fig. 4, an elevation of a nappy or pudding-dish. Fig. 5 represents a tea-pot, pitcher, or other vessel with small parcels of clay attached to the peripheries of the bottom, being a modification of my invention.

The corrugations may be made in any approved manner or style, and applied to articles of various forms, but the above will suffice to illustrate my invention.

These articles for the preparation of food are made of fire-proof earthenware, as before described, and may be made of any design, pattern, or style.

I find that if I leave the bottom of such vessel unglazed, so that there is but one substance—viz., the clay bottom—to be acted upon by the heat, instead of two—viz., the clay bottom and gloss enamel—having different degrees of expansibility, the danger of bursting is avoided; and by further constructing such bottoms with corrugations, allowing the escape of heated air from under pie-plates, or baking-pans, or like utensils resting on flat surfaces in an oven, the heat has free circulation and access to all parts of said vessel, whereby a uniformity of heat is maintained and applied to all parts at the same time. I also enamel the inside of said vessels, if desired, with a white enamel made of porous clay peculiarly mixed, which has the same degree of expansibility as that of which the vessel is made, and which will be the subject of another application.

When it is possible to make such vessels in molds of plaster, or its equivalent, I embody the corrugations in the molds.

On ware made on a thrower's wheel, I corrugate the bottoms with tools to suit the various kinds of ware by grooving the same after being partly dry, or adding small quantities of clay of various shapes, as represented in Fig. 5.

I thus produce a neat, clean, reliable, and substantial cooking utensil for the kitchen and other purposes.

Having thus described my invention, what I claim as new, and desire to secure by Letters Patent, is—

Externally and internally glazed cooking and other utensils, made of clay, having concave bottom, unglazed, and corrugated edges, the former adding to its strength, while, by means of both, a large quantity of heated air is admitted under the utensil, substantially as claimed.

W. A. H. SCHREIBER.

Witnesses:
P. G. CAREY,
ST. C. SMITH.